United States Patent [19]

Burris et al.

[11] 4,038,532
[45] July 26, 1977

[54] ELECTRONIC DIGITAL GAUGE

[75] Inventors: Robert E. Burris, New Berlin; Lester E. Adams, Oak Creek, both of Wis.

[73] Assignee: Prime Manufacturing Corporation, Oak Creek, Wis.

[21] Appl. No.: 638,366

[22] Filed: Dec. 8, 1975

[51] Int. Cl.² .................. G01K 7/10; G01L 1/18
[52] U.S. Cl. .................. 235/151.3; 73/345; 73/362 SC; 73/398 R
[58] Field of Search .......... 235/151.3, 151.32, 151.35; 73/341, 342, 345, 346, 362 SC, 398 R; 307/310; 340/347 CC, 347 AD

[56] References Cited

U.S. PATENT DOCUMENTS

| | | | |
|---|---|---|---|
| 3,383,920 | 5/1968 | Greenly | 73/362 SC |
| 3,459,925 | 8/1969 | Goosey et al. | 235/151.3 |
| 3,777,568 | 12/1973 | Risgin et al. | 235/151.3 |
| 3,837,224 | 9/1974 | Ream, Jr. | 235/151.3 |
| 3,873,857 | 3/1975 | Farrish | 73/362 SC |
| 3,895,356 | 7/1975 | Kraus | 235/151.32 |
| 3,920,969 | 11/1975 | Berglas | 235/151.3 |
| 3,982,110 | 9/1976 | Kawai | 235/151.3 |

Primary Examiner—Felix D. Gruber
Attorney, Agent, or Firm—Michael, Best & Friedrich

[57] ABSTRACT

The invention disclosed herein provides an electronic digital gauge for measuring the magnitude of different physical characteristics. A plurality of transducers are provided having different signal voltage output characteristics including a stand off voltage. A plurality of adjustable compensating scaling means each provide matching calibrated outputs proportional to the changing signal voltage and to the stand off voltage of a given transducer. The scaling means comprises resistive voltage divider networks including potentiometers which are calibrated in conjunction with a conventional analog to digital conversion and display means having an input which receives the calibrated outputs. The display means provides a digital read out generally equal to the magnitude of the characteristic measured by one of the transducers. Interlocking switching means for connecting one of the calibrated outputs to the input, and an adjustable data update timer for controlling the time period for viewing the digital read out are also provided.

10 Claims, 2 Drawing Figures

4,038,532

ELECTRONIC DIGITAL GAUGE

BACKGROUND OF THE INVENTION

The invention relates generally to electronic measuring devices and more particularly to an electronic digital gauge for measuring the magnitude of physical characteristics.

Devices for providing digital read out of such measured characteristics as the voltage or amperage of an electronic circuit are generally well-known in the prior art.

Applicants are unaware of any prior art electronic measuring devices similar to the invention disclosed herein which are suitable for utilizing transducers having different output characteristics and which are suitable for selectively providing measurement and digital read out of different physical characteristics such as temperature and pressure.

SUMMARY OF THE INVENTION

The invention disclosed herein provides an electronic digital gauge for measuring the magnitude of different physical characteristics. The guage comprises one or more transducers each having a signal voltage changing linearly in response to a change in the characteristic measured, the signal voltage including a generally constant stand off voltage. Adjustable compensating scaling means provide matching calibrated outputs for each of the transducers, the calibrated outputs including a scaled output proportional to the transducer signal voltage and including a compensating output generally equal to a portion of the scaled output attributable to the stand off voltage. Analog to digital conversion and display means having an input for receiving one of the matching calibrated outputs is provided; each of the adjustable compensating scaling means is adjusted to provide matching calibrated outputs for one of the transducers so that the display means provides a digital read out generally equal to the magnitude of the physical characteristic measured by the transducer.

In accordance with an embodiment of the invention, the adjustable compensating scaling means comprises a first resistive voltage divider network including a potentiometer, which network is coupled to the transducer signal voltage, and a second resistive voltage divider network including a potentiometer, which network is coupled to a DC voltage source.

Also in accordance with an embodiment of the invention, interlocking switching means are provided for selectively connecting one of the matching calibrated outputs to the input of the analog to digital conversion and display means, the switching means including a zero reference standby switch for connecting the input of the analog to digital conversion and display means to ground.

Still further in accordance with an embodiment of the invention, an adjustable electronic data update timer is connected to the analog to digital conversion and display means to provide a controlled time period for viewing the display means before the next data update occurs.

It is an object of the present invention to provide an electronic digital gauge capable of measuring the magnitude of a plurality of physical characteristics by selectively measuring the signal voltages from a plurality of transducers.

Another object of the present invention is to provide an electronic digital gauge capable of measuring the signal voltage of transducers having different output characteristics.

Still another object of the present invention is to provide an electronic digital gauge having an interlocking switching means including a zero reference standby switch which when activated ties the input of the analog to digital converter to ground so that the digital output should read zero and thus assures the gauge operator that the digital circuitry is operating properly.

A still further object of the present invention is to provide an adjustable electronic data update timer which can be used for controlling the time period for viewing the display means before the next data update occurs so that the electronic gauge can be utilized to measure physical characteristics having frequent or cyclical variations.

Still another object of the present invention is to provide an electronic digital temperature and pressure gauge capable of measuring the signal voltages from a plurality of temperature and pressure transducers.

Further objects, features and advantages of the invention will become apparent from the following detailed description taken in conjunction with the accompanying drawings, showing a preferred embodiment for exemplification.

DESCRIPTION OF THE PREFERRED EMBODIMENT

Figure 1:
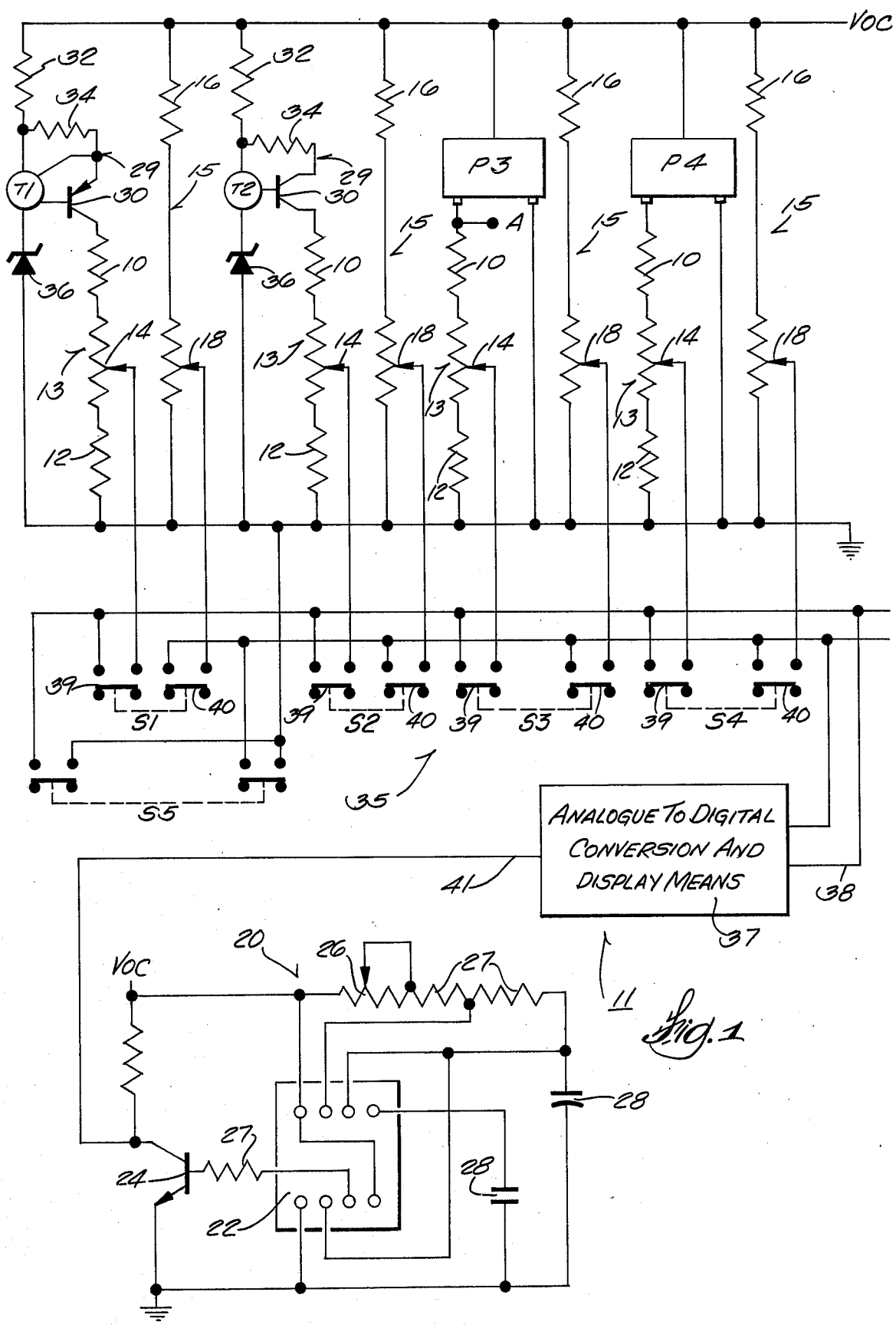
FIG. 1 is a schematic view of an electronic digital gauge embodying the various features of the invention.

Shown in the drawings is a schematic view of an electronic digital gauge 11 for measuring the magnitude of a plurality of physical characteristics. In the preferred construction illustrated, two temperature transducers T1 and T2 and two pressure transducers, P3 and P4, are included, although it is to be understood that the number and type of transducers used can be varied. The transducers shown are of a conventional design, each having a silicon substrate which provides a signal voltage which changes substantially linearly over a given gauge in response to a change in the temperature or pressure to be measured, each signal voltage including a generally constant stand off voltage. In general, the output signal voltage characteristics of transducers vary dependent upon manufacture and range of operation and the various transducer signal voltages include different generally constant stand off voltages. The transducers shown are powered by a conventional DC voltage source (not shown). Preferably the DC voltage source supplies a voltage, represented in the drawings by the subscript $V_{DC}$, on the order of 15 volts DC, which voltage is coupled to the transducers by a conventional on-off switch (not shown).

Adjustable compensating scaling means for providing matching calibrated outputs including a scaled output and a compensating output for each of the transducers are provided. In the preferred embodiment, each of the adjustable compensating scaling means comprises a first resistive voltage divider network 13 coupled to the output of one of the transducers, which network 13 includes resistance elements 10 and 12 and a potentiometer 14 which provides a scaled output proportional to the signal voltage of the given transducer, and also comprises a second resistive voltage divider network 15 coupled to $V_{DC}$, which network 15 includes a resistive element 16 and a potentiometer 18 which provides a compensating output generally equal to a portion of the scaled output attributable to the stand off voltage of the signal voltage.

In the preferred embodiment, in order to insure substantially linear operation of the temperature transducers T1 and T2, it is necessary to prevent loading down of the temperature transducer signal voltages. To insure linear operation, a buffer means 29 can be provided for each temperature transducer to amplify and isolate the temperature transducer signal voltage. Preferably the buffer means 29 includes a conventional pnp transistor 30 powered by $V_{DC}$. The emitter to base junction of the transistor 30 is positively biased by resistive elements 32 and 34 and the base to collector junction is positively biased by the voltage across a zener diode 36. The diode 36 holds the base of the transistor at a voltage level above ground equal to the breakdown voltage of the zener diode, preferably on the order of 3½ volts DC.

Switching means 35 for selectively connecting one of the matching calibrated outputs from one of the transducers to the input 38 of a conventional analog to digital conversion and display means 37 is provided. In the preferred embodiment the switching means 35 comprises a plurality of interlocking two pole single throw switches designated S1, S2, S3 and S4 which selectively connect the matching calibrated outputs for transducers T1, T2, P3, P4, respectively, to the input 38 of the analog to digital conversion and display means 37.

More specifically, each of the switches includes a pair of contacts 39 and 40 which when closed connect one of the matching calibrated outputs comprisng a scaled output from one of the potentiometers 14 and a compensating output from one of the potentiometers 18, respectively, into the input 38 of the analog to digital conversion and display means 37. Preferably, activation of one of the interlocking switches closes the contacts 39 and 40 of the switch activated and insures that the contacts 39 and 40 of the remainder of the switches are open so that only one set of the matching calibrated outputs will be fed to the input 38 at one time.

Preferably, the switching means includes a zero reference standby switch S5 which couples the input 38 of the analog to digital conversion and display means 37 to ground. When the standby switch S5 is activated, the digital output should read zero, thus assuring the operator of the gauge that the digital circuitry is operating properly.

An adjustable electronic data update timer 20 utilizing a conventional integrated circuit timer 22 is provided. The update timer is connected to the analog to digital conversion and display means 37 by control line 41 and can be adjusted to provide a controlled time period for viewing the display means before the next data update occurs. A more specific description of the conventional analog to digital conversion and display means 37 and the update timer 20 will be given below.

Figure 2:
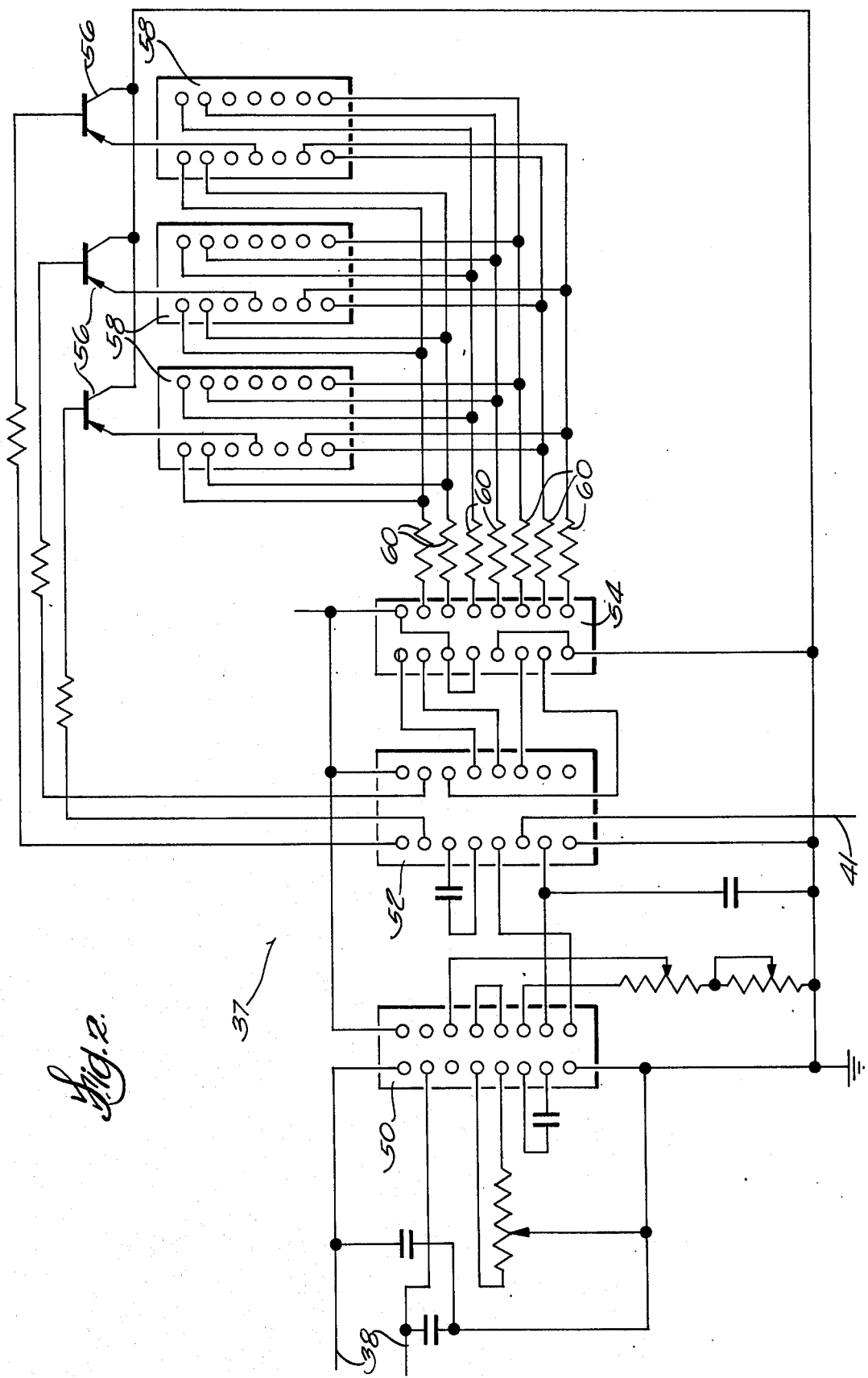
FIG. 2 is a more detailed schematic view of the analog to digital conversion and display means shown in FIG. 1.

The construction and operation of analog to digital conversion and display circuitry is well-known in the art. A general description of the major elements of the conventional analog to digital conversion display means 37 will be given to aid in the understanding of the invention disclosed herein. As shown schematicaly in FIG. 2, the analog to digital conversion and display means 37 is comprised of conventional integrated circuit elements connected through conventional switching elements to conventional display means. More specifically, an IC analog to digital converter 50 in association with an IC analog to digital logic subsystem 52 provides processing and conversion of an unknown signal received from the input 38 to a digital value. As will be explained in more detail below, the preferred resolution of the analog to digital conversion and display means 37 is one digit per millivolt change in the signal fed into the input 38. The input 38 is connected to an operational amplifier (not shown) contained in the IC analog to digital converter 50 which in effect subtracts the compensating output from the scaled output as will be described in more detail below. The digital logic subsystem 52 strobes the latching circuitry (not shown) contained in an IC decoder/driver 54 which stores the data. Switching pulses from the digital logic subsystem 52 strobe the switching transistors 56 which control the display means, more specifically which control the common cathodes of three, seven-element digital displays 58.

The IC decoder/driver 54 provides current through limiting resistors 60 for excitation to the appropriate segments in each digital display 58 during each strobing sequence. The control line 41 of the data update timer 20 periodically connects the IC digital logic subsystem 52 to ground to provide a controlled time period for viewing a particular digital value before the latching circuitry is allowed to receive an updated digital value as will be explained in more detail below.

Specific designations of components in the analog to digital conversion and display means 37 and the data update timer 20, which may be utilized, for example, are as follows:

| | |
|---|---|
| A/D converter 50 | MC1405L Motorola |
| A/D Logic Subsystem 52 | MC14435VL Motorola |
| Decoder - driver 54 | MC14511CP Motorola |
| 7 Element Displays 58 | Monsanto 4740 |
| Timer 22 | MCL455T1 Motorola |

CALIBRATION OF GAUGE

The following section will describe the caibration of the adjustable compensating scaling means; more specifically it will describe the calibration of one of the first and second resistive voltage divider networks 13 and 15 for providing matching calibrated outputs for the pressure transducer P3. Through modifications obvious to those skilled in the art, similar calibrations can be performed on the other resistive voltage divider networks for porviding matching calibrated outputs for transducers T1, T2, and P4; the calibration being dependent on the particular signal voltage output characteristics of the transducers. The calibration will be described for the transducer P3 being used in conjunction with the conventional analog to digital conversion and display means 37 having a specific resolution of 1 digit per millivolt change, although again, the procedure is generally applicable for analog to digital conversion and display means having different resolutions. The following description is for the purpose of example only and should not be regarded as limiting the scope of the invention disclosed herein.

The pressure transducer P3 has a signal voltage which changes linearly at point A, shown in FIG. 1 from 2.5 to 12.5 volts corresponding to a change in pressure from 0 to 300 pounds per square inch (hereinafter referred to as p.s.i.). The signal voltage includes a generally constant stand off voltage of 2.5 volts which is determined by measuring the signal voltage at point A when the pressure transducer P3 is introduced into a 0 p.s.i. reference. As noted, the analog to digital conversion and display means 37 has a resolution of 1 digit per millivolt change and is provided with three digital displays 58, and is capable of measuring an actual change in voltage from 0 to 999 millivolts.

The desired pressure range to be displayed on the three digital displays 58 is 0 to 300 p.s.i. In order to provide the desired digital read out which varies from 000 to 300 as the signal voltage of the pressure transducer varies from 2.5 to 12.5 volts, the adjustable compensating scaling means for the pressure transducer P3 must provide matching calibrated outputs which, when switched to the input 38 of the analog to digital conversion means, produce a signal which in effect varies from 0 to 300 millivolts. Since the total voltage change at point A of the signal voltage of the pressure transducer P3 is 10 volts, the resistive elements 10 and 12 are selected and the potentiometer 14 is initially adjusted so that the scaled output from the potentiometer 14 is equal to 3 percent of the transducer signal voltage output at point A, thus providing the desired 300 millivolt change. In the preferred embodiment illustrated, the resistive elements 10 and 12 selected for the pressure transducer P3 are generally equal to 12.1 thousand ohms and 200 ohms respectively; the potentiometer 14 is adjustable from 0 to 200 ohms.

It is necessary to compensate for the portion of the scaled output attributable to the 2.5 volts stand off voltage at the 0 p.s.i. reference so that the digital displays 58 read 000 at 0 p.s.i. The resistive element 16 is selected and the potentiometer 18 is adjusted to provide a compensating output generally equal to the portion of the scaled output attributable to the stand off voltage. In effect, the compensating output from the potentiometer 18 should be generally equal to 3 percent of the 2.5 volt stand off voltage. In the preferred construction illustrated, the resistive element 16 is generally equal to 2.7 thousand ohms and the potentiometer 18 is adjustable from 0 to 100 ohms.

In order to properly adjust the potentiometer 18, the transducer P3 is introduced into a 0 p.s.i. reference; thereafter the scaled output and compensating output from the potentiometers 14 and 18 respectively are connected through the switch S3 to the input 38 of the analog to digital conversion and display means 37. The potentiometer 18 is adjusted until the digital displays 58 provide a digital read out of 000. As described, the input 38 of the conventional analog to digital conversion and display means 37 is connected to an operational amplifier (not shown). The operational amplifier in effect subtracts the compensating output generally equal to a portion of the scaled output attributable to the stand off voltage from the scaled output so that the stand off voltage of the pressure transducer is compensated for and the digital displays 58 provide a digital read out of 000 when the transducer is introduced into the 0 p.s.i. reference.

The potentiometer adjustments can be refined further insuring substantial linearity of operation over the desired pressure range by introducing the trandsucer P3 into a 300 p.s.i. reference. The potentiometer 18 is again adjusted, if necessary, until the digital displays 58 read 300. The transducer P3 is then reintroduced into the 0 p.s.i. reference and the potentiometer 14 is adjusted, if necessary, until the digital displays 58 again read 000. At this point the adjustable compensating scaling means provides matching calibrated outputs to the input 38 of the analog to digital conversion and display means 37 so that as the signal voltage of the pressure transducer P3 varies from 2.5 to 12.5 volts in response to a change in pressure from 0 to 300 p.s.i., the digital displays 58 provide a digital read out which varies from 000 to 300.

As described earlier, inherent in the IC decoder/driver 54 of the conventional analog to digital conversion and display means 37 is a latching circuit (not shown) which receives and holds the changing digital values from the IC digital logic subsystem 52. The latching circuit continues to hold the digital value which is displayed by the digital displays 58 as a digital read out until another digital value is received from the digital logic subsystem 52. In some applications, where the magnitude of the characteristic measured changes frequently or in a cyclical fashion, such as the pressure of a cylinder in a compressor, the digital logic subsystem 52 feeds the latching circuit with changing digital values too frequently and the digital read out becomes a blur of changing numbers. In order to provide a digital display read out which can be utilized under these conditions, the electronic data update timer 20 is provided as a means of providing a controlled time period for viewing the digital displays 58 before the latching circuit can receive another digital value from the digital logic subsystem 52.

The adjustable electronic data update timer 20 comprises a conventional integrated circuit timer 22 coupled to a switching transistor 24 which periodically turns on, or conducts, to connect the control line 41 and the digital logic subsystem 52 of the analog to digital conversion and display means 37 to ground, thus allowing the latching circuit to receive a new digital value from the digital logic subsystem 52. The period during which the transistor is off, or duty cycle, is the period during which the digital value is held by the latching circuit and can be viewed before the transistor again turns on and another data update occurs. The duration of the duty cycle can be varied by adjustment of a potentiometer 26 and by conventional selection of external resistive elements 27 and capacitive elements 28 connected to the integrated circuit timer 22.

The adjustable electronic data update timer 20 is particularly useful where the characteristic measured by the transducer varies in a cyclical fashion. As an example, if the pressure transducer P3 is used to measure the pressure in a conventional compressor, the duty cycle of the timer can be adjusted so the transistor 24 is periodically turned on so that the latching circuit receives a digital value at a given point in time corresponding to a time when a piston is at a particular position in the cylinder during each of the cycles of the operation of the compressor.

It is to be understood that the invention is not confined to the particular construction and arrangement of parts herein illustrated and described, but embraces all such modified forms thereof as come within the scope of the following claims.

We claim:

1. An electronic digital gauge for measuring the magnitude of a physical characteristic, said gauge comprising:

a. a transducer having a signal voltage which changes substantially linearly in response to a change in the physical characteristic to be measured, said signal voltage including a generally constant stand off voltage, b. adjustable compensating scaling means for providing matching calibrated outputs, said calibrated outputs including a scaled output proportional to said signal voltage and a compensating output generally equal to a portion of said scaled output attributable to said stand off voltage, c. analog to digital conversion and display means having an input adapted for receiving said matching calibrated outputs, and d. switching means for affording selectively connecting said matching calibrated outputs to said input, said compensating scaling means being adjustable to afford calibrating said scaled output and said compensating output of said matching calibrated outputs so that when said switching means connects said matching calibrated outputs to said input of said analog to digital conversion and display means, processes said matching calibrated output and provides a digital read out generally equal to the magnitude of the physical characteristic.

2. An electronic digital gauge in accordance with claim 1 wherein said adjustable compensating scaling means comprises a first resistive voltage divider network including a potentiometer, said first network being coupled to said transducer signal voltage to provide said scaled output, and a second resistive voltage divider network including a potentiometer, said network being coupled to a DC voltage source to provide said compensating output.

3. An electronic digital gauge in accordance with claim 1 further comprising:
an adjustable electronic data update timer connected to said analog to digital conversion and display means to provide a controlled time period for viewing said digital read out before the next data update occurs.

4. An electronic digital gauge in accordance with claim 1 wherein said switching means includes a zero reference standby switch for connecting said input of said analog to digital conversion and display means to ground.

5. An electronic digital gauge for measuring the magnitude of at least two different physical characteristics, said gauge comprising:

a. at least two types of transducers, each having a signal voltage which changes substantially linearly in response to a change in the particular characteristic to be measured, each of said transducer signal voltages including a generally constant stand off voltage, b. at least two adjustable compensating scaling means, each providing matching calibrated outputs for one of said transducers, each of said matching calibrated outputs including a scaled output proportional to the signal voltage of one of said transducers and a compensating output generally equal to a portion of said scaled output attributable to the stand off voltage of said signal voltage, c. analog to digital conversion and display means having an input for receiving one of said matching calibrated outputs for one of said transducers, and d. interlocking switching means for affording selectively connecting one of said matching calibrated outputs for one of said transducers to said input so that said analog to digital conversion and display means processes said one of said matching calibrated outputs and provides a digital read out generally equal to the magnitude of the physical characteristic measured by said one of said transducers, said interlocking switching means being operable so that only one of said matching calibrated outputs for one of said transducers is connected to said input at one time.

6. An electronic digital gauge in accordance with claim 5 wherein each of said adjustable compensating scaling means for providing one of said matching calibrated outputs comprises a first resistive voltage divider network including a potentiometer, said first network being coupled to one of said transducer signal voltages to provide a scaled output, and a second resistive voltage divider network including a potentiometer, said second network being coupled to a DC voltage source to provide a compensating output.

7. An electronic digital gauge in accordance with claim 5 wherein said transducers include at least one pressure transducer and at least one temperature transducer.

8. An electronic digital gauge in accordance with claim 5 further comprising an adjustable electronic data update timer connected to said analog to digital conversion and display means to provide a controlled time period for viewing said digital read out before the next data update occurs.

9. An electronic digital gauge in accordance with claim 5 wherein said interlocking switching means includes a zero reference stand by switch for connecting said input of said analog to digital conversion and display means to ground.

10. An electronic digital temperature and pressure gauge comprising:

a. at least one temperature transducer and at least one pressure transducer, each of said transducers having a signal voltage which changes substantially linearly in response to a change in the characteristic measured, each of said signal voltages including a generally constant stand off voltage, b. a plurality of adjustable compensating scaling means, each providing matching calibrated outputs for one of said temperature and pressure transducers, each of said matching calibrated outputs including a scaled output proportional to the signal voltage of one of said transducers and a compensating output generally equal to a portion of said scaled output attributable to the stand off voltage of said signal voltage, each of said adjustable compensating scaling means comprising a first resistive voltage divider network including a potentiometer, said first network being coupled to one of said transducer signal voltages to provide a scaled output, and comprising a second resistive voltage divider network including a potentiometer, said second network being coupled to a DC voltage source to provide a compensating output, c. analog to digital conversion and display means having an input for receiving one of said matching calibrated outputs for one of said temperature and pressure transducers, d. interlocking switching means for selectively connecting one of said matching calibrated outputs for one of said temperature and pressure transducers to said input so that said analog to digital conversion and display means processes said one of said matching calibrated outputs and provides a digital read out generally equal to the magnitude of the characteristic measured by said one of said transducers, said interlocking switching means being operable so that only one of said matching calibrated outputs for one of said transducers is connected to said input at one time, said switching means also including a zero reference standby switch for connecting said input of said analog to digital conversion and display means to ground, and e. an adjustable electronic data update timer connected to said analog to digital conversion and display means to provide a controlled time period for viewing said digital read out before the next data update occurs.

* * * * *

UNITED STATES PATENT OFFICE
CERTIFICATE OF CORRECTION

Patent No. 4,038,532                Dated July 26, 1977

Inventor(s) ROBERT E. BURRIS and LESTER E. ADAMS

It is certified that error appears in the above-identified patent and that said Letters Patent are hereby corrected as shown below:

Column 2, line 48, "gauge" should read --range--.

Column 3, line 67, "schematicaly" should read --schematically--.

Column 4, line 52, "porviding" should read --providing--.

Column 4, line 66, after "Fig. 1" insert --,--.

Column 5, line 32, change "2.5 volts" to --2.5 volt--.

Column 7, line 20, before "processes" insert --said analog to digital conversion and display means--.

Column 7, line 29, add --second-- before "net-".

Signed and Sealed this

Twenty-second Day of November 1977

[SEAL]

Attest:

RUTH C. MASON
Attesting Officer

LUTRELLE F. PARKER
Acting Commissioner of Patents and Trademarks